United States Patent

Hughes et al.

[11] Patent Number: 6,130,523
[45] Date of Patent: Oct. 10, 2000

[54] GENERATOR TRANSFER FUNCTION REGULATOR

[75] Inventors: Frank Michael Hughes, Sale, United Kingdom; Mohammad Sadegh Ghazizadeh, Teheran, Islamic Rep. of Iran

[73] Assignee: Rolls Royce Power Engineering Plc, Derby, United Kingdom

[21] Appl. No.: 09/202,295

[22] PCT Filed: May 13, 1997

[86] PCT No.: PCT/GB97/01283

§ 371 Date: Sep. 24, 1999

§ 102(e) Date: Sep. 24, 1999

[87] PCT Pub. No.: WO97/43822

PCT Pub. Date: Nov. 20, 1997

[30] Foreign Application Priority Data

May 16, 1996 [GB] United Kingdom .................... 9610265

[51] Int. Cl.[7] ................................ H02P 9/10; H02P 9/44
[52] U.S. Cl. ................................ 322/45; 322/19; 322/22; 322/58
[58] Field of Search ................................ 322/19, 22, 25, 322/28, 29, 44, 45, 58

[56] References Cited

U.S. PATENT DOCUMENTS

| | | | |
|---|---|---|---|
| 3,936,722 | 2/1976 | Goto et al. | 322/20 |
| 4,527,226 | 7/1985 | Glendon | 363/41 |
| 4,733,156 | 3/1988 | Tanaka et al. | 322/20 |
| 4,967,129 | 10/1990 | Tanaka | 318/621 |
| 4,994,684 | 2/1991 | Lauw et al. | 290/52 |
| 5,055,765 | 10/1991 | Rozman et al. | 322/22 |
| 5,300,876 | 4/1994 | Takagi | 322/58 |
| 5,440,222 | 8/1995 | Tanaka et al. | 322/25 |
| 5,483,147 | 1/1996 | Ilic et al. | 322/25 |
| 5,604,420 | 2/1997 | Nambu | 322/19 |
| 5,698,968 | 12/1997 | Takagi et al. | 322/58 |
| 5,977,731 | 11/1999 | Xia et al. | 318/147 |

OTHER PUBLICATIONS

Proceedings of the 29th IEEE Conference on Decision and Control Dec. 5–7, 1990, IEEE Control Systems Society, vol. 3 of 6.

Primary Examiner—Nicholas Ponomarenko
Attorney, Agent, or Firm—Clifford W. Browning; Woodard, Emhardt, Naughton, Moriarty & McNett

[57] ABSTRACT

A generator transfer function regulator incorporating two control loops. The first control loop produces a first generator excitation control signal (U) which varies to compensate for variations in the magnitude of the generator output voltage ($V_1$). The second generator loop produces a second generator excitation control signal ($U_e$) which varies so as to maintain substantially constant the response of the generator system to variations in the generator output. The two control signals are combined and applied to a conventional generator exciter circuit (2). As a result, the generator terminal voltage ($V_1$) control performance achieved by the AVR under open circuit conditions is effectively maintained when the generator is loaded over its range of operation, irrespective of the power system which the generator feeds.

4 Claims, 2 Drawing Sheets

GENERATOR TRANSFER FUNCTION REGULATOR

The present invention relates to a generator transfer function regulator for use in a generator excitation control system.

Conventional generating systems incorporate automatic voltage regulators the objective of which is to stabilise the generator output. In any generator which is connected to a power system changes in the load represented by that power system result in changes in the generator terminal voltage. A conventional automatic voltage regulator (AVR) control system detects such changes and adjusts the excitation voltage of the generator with a view to maintaining the terminal voltage magnitude close to a predetermined value.

The dynamic characteristics of a generator are strongly influenced by the load on the generator and the operating conditions of the power system to which it is connected. Thus the dynamic characteristics can vary significantly in dependence upon the way in which the generator is used and change with the characteristics of the power network that the generator supplies.

Conventional AVR systems have fixed parameters, that is there is a fixed relationship between the magnitude of the generator voltage output and a control signal which is generated by the AVR for application to an excitation controller of the generator. As a result, the control performance achieved with conventional AVR's varies significantly with system conditions. Although AVR systems can be designed with control parameters that provide a good performance for a chosen set of operating conditions, when different conditions arise the performance of the AVR can be unsatisfactory and in some circumstances unstable.

Theoretical models representing the performance of generators and systems to which those generators are connected have been known for many years. It is known from those models that information about the performance of the generator can be obtained by calculating the direct and quadrature axis voltage and current signals in respect of each phase and the generator rotor angle. The direct and quadrature axis voltage and current signals are not available by direct measurement of the signals appearing at the generator output terminals and must be calculated from the signals which do appear at those terminals. It has been proposed to calculate the direct and quadrature axis components of the current and voltage and by extrapolation of the current components to estimate the required terminal voltage response to compensate for fluctuations in the generator load. The article by M. Saidy and F. M. Hughes: "A first order predictive excitation control of generator terminal voltage", International Journal of Electrical Power and Energy Systems, Volume 16, No. 2, 1994 pages 73–82 describes how to adjust a voltage reference applied to an excitation voltage controller dynamically such that excursions of the generator output are eliminated over a number of steps. This attenuates the demand on the control signal, which is a desirable feature due to the voltage constraints imposed on the field winding, and the lower band width requirement enables a simpler model of the generator to be employed in the predictive algorithm.

It is difficult to design a controller of standard form which can be readily adapted to a particular application and in particular it is not possible to test the performance of such a controller off-line. Furthermore, the retrofitting of sophisticated predictive voltage controllers to generators already fitted with AVR compensators so as to achieve a predictable improvement in generator performance is difficult to achieve.

It is an objective of the present invention to obviate or mitigate the problems outlined above.

According to the present invention, there is provided a generator transfer function regulator comprising a first control loop responsive to variations in the magnitude of the generator output voltage to produce a first generator excitation control signal, a second control loop responsive to the generator rotor angle and the current and voltage of each phase of the generator to produce a second generator excitation control signal, and means for combining the first and second signals to form a combined signal for application to a generator exciter, wherein the first control loop is designed to vary the first control signal to compensate for variations in the magnitude of the generator output voltage, and the second control loop is designed to vary the second control signal to maintain substantially constant generator voltage response characteristics.

The first control loop may be a conventional AVR arranged to vary its output control signal to provide good voltage control when the generator is open circuit. Accordingly the first control loop can be provided by an available AVR and in existing generator plants such an AVR is generally already in place. The second control loop can be designed directly from transfer function models of the generator and the exciter, such models being well understood. Accordingly the second control loop can be readily designed to maintain the dynamic response characteristics relating the AVR output to the generator terminal voltage magnitude approximately constant. Therefore, given that the second control loop counteracts the influence of the generator load current on the dynamic behaviour of the system, the voltage response characteristics at open circuit conditions may be essentially maintained under loaded conditions over a broad operating range of the generator.

The second control loop of the regulator may comprise a signal processor which produces a signal representing the direct axis current and voltage of the generator, and an auxiliary compensator which converts the direct axis current and voltage signals to the second control signal. The detailed design of the auxiliary compensator will depend upon the transfer function model selected for the generator and exciter and various detailed circuit configurations will be capable of producing acceptable performance.

An embodiment of the present invention will now be described, by way of example, with reference to the accompanying drawings, in which.

Figure 1:
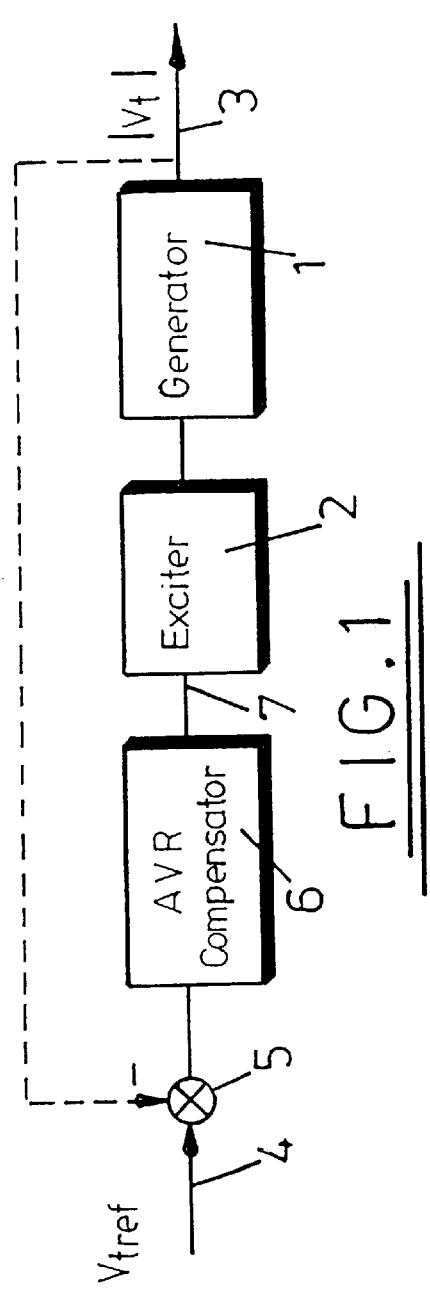
FIG. 1 is a schematic representation of a conventional generator system incorporating an AVR.

Referring to FIG. 1, the illustrated circuit is of conventional form. A generator 1 is controlled by an exciter 2 so as to provide a signal $V_t$ on output 3. The magnitude of the signal $V_t$ is determined by the signal $V_{tref}$ on an input 4. A signal representing the magnitude of the voltage on output 3 is applied to a summing circuit 5 to which the reference voltage signal on input 4 is also applied. The combined output of the summing circuit 5 is applied to a compensator circuit 6 which applies a generator excitation control signal on output 7 to the exciter 2.

With the arrangement of FIG. 1, when the loading conditions on the generator vary the terminal voltage on output 3 also varies. Such variations affect the signal applied to the compensator 6 and as a result the excitation voltage on line 7 is adjusted so as to cause the voltage on output 3 to increase or decrease and thereby reduce the difference between the actual terminal voltage magnitude and the desired value for that magnitude. The compensator 6 is normally designed to provide a well damped terminal voltage response under open circuit conditions. Unfortunately, when the generator is driving a load and the load conditions fluctuate, the response of the compensator 6 will not be appropriate to the response of the generator to such changes in the load conditions. As a result instability can arise with potentially disastrous consequences. Accordingly in conventional power transmission systems the capability of the system is invariably limited by generator stability considerations rather than theoretical thermal design limits.

Figure 2:
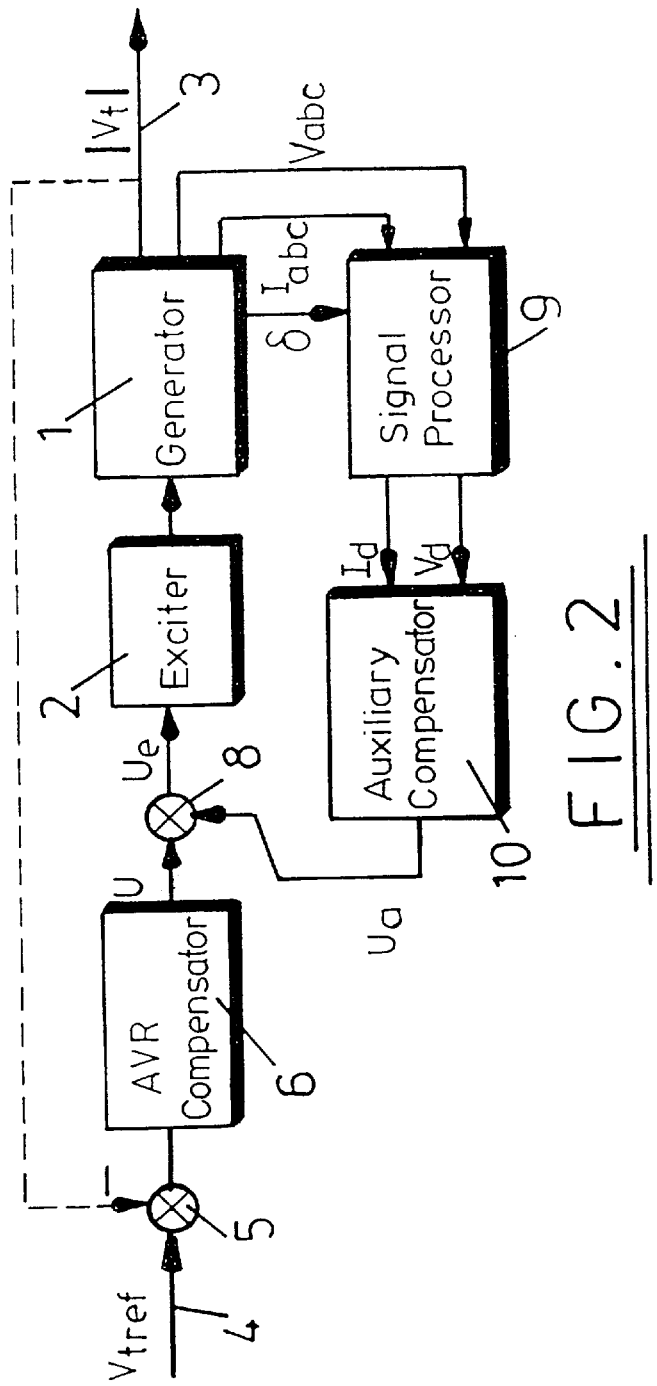
FIG. 2 is a schematic representation of an embodiment of the present invention.

FIG. 2 illustrates a circuit in accordance with the present invention which provides an improved performance as compared with the circuit of FIG. 1. The same reference numerals are used throughout the drawings for equivalent components. It will be noted that components 1 to 6 of FIG. 1 are replicated exactly in the circuit of FIG. 2 but that an additional summing circuit 8 is interposed in the connection between the conventional AVR compensator 6 and the conventional exciter 2. The summing circuit 8 receives an input from an auxiliary loop circuit comprising a signal processor 9 and an auxiliary compensator 10.

The signal processor receives seven inputs from the generator, that is the generator output voltages Va, Vb and Vc in respect of each of the three phases, current signals Ia, Ib and Ic for the three phases, and a rotor angle position signal δ. The signal processing unit converts the phase measurements and rotor angle signal into voltage and current signals with respect to the direct and quadrature axis of the generator. The current signal Id with respect to the direct axis and the voltage signal Vd with respect to the direct axis are output to the auxiliary compensator 10. The generation of the signals output by the signal processor 9 from the seven signals input to that processor is based on the well known Park's Transformation as described in for example "Two reaction theory of synchronous machines" by Park A. H., AIEE Trans., 48, pp 716–30,1929.

The auxiliary compensator 10 transforms the direct axis voltage and current signal to an output signal $U_a$ which is applied to the summing circuit 8. The compensator 10 is designed directly from a transfer function model derived from a generator representation, for example that described in the article by Hammons and Winning "Comparisons of Synchronous Machine Models in the Study of the Transient Behaviour of Electrical Power Systems", Proc. IEE, Volume 118, No. 10, October 1971. The compensator is designed such that the dynamic response characteristics relating the AVR output signal U to the magnitude of the generator terminal voltage $V_t$ is kept approximately constant. Thus the influence of the generator load current on the dynamic behaviour of the system is counteracted and voltage response characteristics corresponding to open circuit conditions are essentially maintained under loaded conditions over a wide operating range of the generator. That is to say, the signal $U_e$ applied to the exciter 2 is the sum of the signals $U_a$ and U. The signal $U_a$ is zero when the generator is operating under open circuit conditions. When the generator is not operating under open circuit conditions, the signal $U_a$ maintains the relationship between the response of the generator and the magnitude of the signal U as if the generator was still operating under open circuit conditions. As a consequence. the system provides essentially the same voltage control performance under loaded and open circuit conditions.

Figure 3:
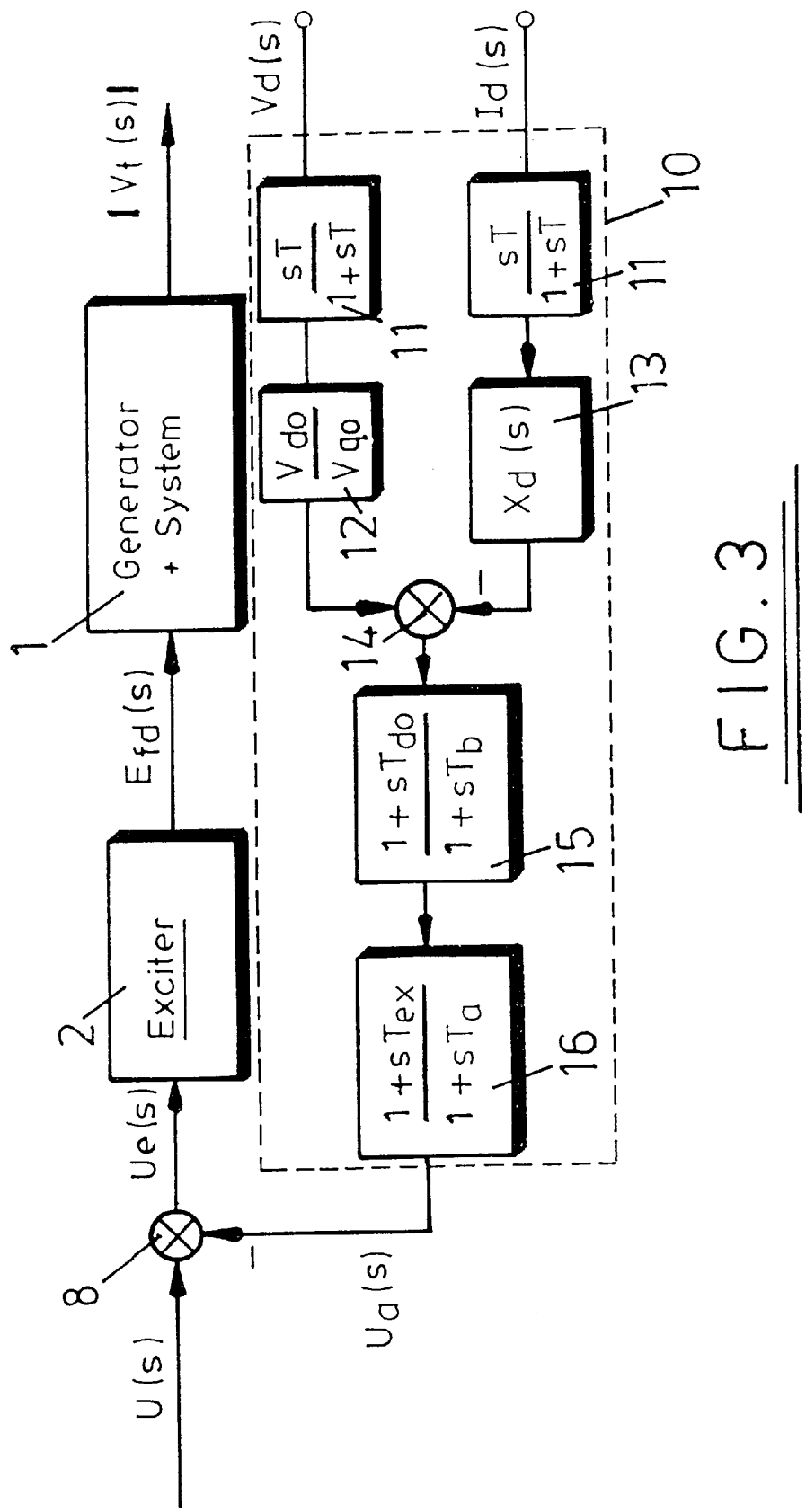
FIG. 3 is a schematic representation of details of the circuit shown in FIG. 2.

FIG. 3 illustrates components 1, 2, 8 and 10 as shown in FIG. 2, sub-components of the auxiliary compensator 10 being shown in greater detail. The standard s domain notation is used to indicate the performance of the various sub-components.

The signal processor 9 and auxiliary compensator 10 ensure that the generator terminal voltage control performance achieved by the AVR under open circuit conditions is effectively maintained when the generator is loaded over its range of operation, irrespective of the power network which it feeds. Thus the range of stable control operation of a conventional AVR is considerably extended and improved rotor angle damping may be provided, particularly at extreme generator operating conditions. The auxiliary compensator may be designed from standard models of the generator and exciter the parameters of which are readily available. The design of the auxiliary compensator is independent of the power system which the generator will feed. Accordingly the generator control system can be designed and tested under open circuit conditions in the factory with the knowledge that essentially the same voltage control performance will be obtained in use independent of the loading condition.

Referring in greater detail to the component parts of the auxiliary compensator 10 of FIG. 3, components 11 are "wash-out" elements which provide a zero output under steady state conditions. Under steady state conditions, s=0 and hence the output is zero. Under dynamic conditions, sT is very much greater than one, and hence the elements give a gain which is approximately equal to one.

The component 12 provides a variable gain to accommodate changing operating conditions. Vdo and Vqo are obtained by averaging signals over a suitable period. They are essentially steady state operating values.

The component 13 provides a transfer function Xd(s) from:

$$E_q(s)=g(s)E_{rd}(s)-X_d(s)I_d(s)$$

and $$E_d(s)=X_q(s)I_q(s)$$

Normally, $$Xd(s) = \frac{Xd(1+sTd')}{(1+sTdo')} \frac{(1+sTd'')}{(1+sTdo'')}$$

Time constants Tdo', Tdo", Td' and Td" are standard generator parameters.

The outputs of components 12 and 13 are applied by a summing circuit 14 to a compensation function for the exciter and generator field made up of components 15 and 16. Component 15 is a realisable transfer function approximation to 1/g(s) given that:

$$g(s) = \frac{1}{1+sTdo'}$$

Component 16 is a realisable transfer function approximation to $1/g_{ex}(s)$ given that:

$$g_{ex}(s) = \frac{1}{1+sT_{ex}}$$

Alternatives to the components described as making up the auxiliary compensator 10 are known, but the illustrated components represent a realisable structure for implementing the present invention. One possible enhancement to the described system would be to provide a limit circuit between the auxiliary compensator 10 and the summing circuit 8. The limit design would be based on a linearised model and hence small signals. For large disturbances the limit prevents excessive action from the auxiliary loop and normal AVR action therefore dominates initially.

With a conventional AVR, tight voltage control is usually achieved at the expense of a reduction in the damping of the generator rotor oscillation. In addition to providing improved voltage control, the present invention serves to improve rotor damping and thereby extends the range of stable generator operations. The power transmission capability of a system is invariably limited by generator stability considerations, rather than thermal design limits. Therefore extending the range of stable generator operations can have great economic and ecological benefits, since by increasing the power transmission capability of an existing transmission system the necessity of building new power lines can be avoided or delayed.

What is claimed is:

1. A generator transfer function regulator comprising a first control loop responsive to variations in the magnitude of the generator output voltage to produce a first generator excitation control signal, a second control loop responsive to the generator rotor angle and the current and voltage of each phase of the generator to produce a second generator excitation control signal, and means for combining the first and second signals to form a combined signal for application to a generator exciter, wherein the first control loop is designed to vary the first control signal to compensate for variations in the magnitude of the generator output voltage, and the second control loop is designed to vary the second control signal to maintain the dynamic response characteristics relating the first control signal to the generator terminal voltage magnitude approximately constant.

2. A regulator according to claim 1, wherein the second control loop comprising a signal processor which produces signals representing the direct axis current and voltage of the generator, and an auxiliary compensator which converts the direct axis current and voltage signals to the second control signal.

3. A regulator according to claim 1, wherein the first control loop varies the first control signal assuming an open circuit generator output.

4. A regulator according to claim 2, wherein the first control loop varies the first control signal assuming an open circuit generator output.

* * * * *